(12) United States Patent
Zhao et al.

(10) Patent No.: US 8,786,807 B2
(45) Date of Patent: Jul. 22, 2014

(54) LIQUID CRYSTAL DISPLAY MODULE AND LIQUID CRYSTAL DISPLAY DEVICE

(75) Inventors: Guodong Zhao, Guandong (CN); FangFu Chen, Guandong (CN); Tao Ding, Guandong (CN); Ming Liu, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 255 days.

(21) Appl. No.: 13/510,936

(22) PCT Filed: Apr. 20, 2012

(86) PCT No.: PCT/CN2012/074418
§ 371 (c)(1),
(2), (4) Date: May 19, 2012

(87) PCT Pub. No.: WO2013/155697
PCT Pub. Date: Oct. 24, 2013

(65) Prior Publication Data
US 2013/0271704 A1    Oct. 17, 2013

(51) Int. Cl.
*G02F 1/1333* (2006.01)
(52) U.S. Cl.
USPC ................................................. 349/110
(58) Field of Classification Search
USPC ................................................. 349/110
See application file for complete search history.

(56) References Cited

U.S. PATENT DOCUMENTS

| | | | |
|---|---|---|---|
| 7,436,473 B2 * | 10/2008 | Nam et al. | 349/110 |
| 2002/0044232 A1 * | 4/2002 | Cho et al. | 349/43 |
| 2002/0196393 A1 * | 12/2002 | Tashiro et al. | 349/106 |
| 2007/0242208 A1 * | 10/2007 | Tsai et al. | 349/153 |
| 2008/0117377 A1 * | 5/2008 | Chan et al. | 349/153 |
| 2009/0122244 A1 * | 5/2009 | Motomatsu | 349/122 |
| 2011/0255041 A1 * | 10/2011 | Inoue | 349/123 |

* cited by examiner

*Primary Examiner* — Timothy L Rude
(74) *Attorney, Agent, or Firm* — Andrew C. Cheng

(57) ABSTRACT

The present invention provides a liquid crystal display module configured with a color filter substrate, a TFT substrate, a layer of liquid crystal, and a sealant. The TFT substrate and the color filter substrate are arranged opposite to each other and the sealant is used to confine the layer of liquid crystal within the space defined between the TFT substrate and the color filter substrate. The color filter substrate includes a first glass substrate, a transparent conductive layer, and a black matrix. Wherein the transparent conductive layer is laminated over the black matrix and defines a recess which is located on a surface facing the layer of liquid crystal of the first glass substrate. The recess is surrounded by the black matrix, and end of the sealant abuts against the recess, and a width of the sealant is smaller than the width of the recess. The present invention further provides a LCD device incorporated with a LCD module as described. The present invention can readily provide a recognizable benchmark for identifying and checking the border of the sealant. The area of the sealant applied can be readily inspected and checked, therefore ensure the quality of the final product.

10 Claims, 3 Drawing Sheets

LIQUID CRYSTAL DISPLAY MODULE AND LIQUID CRYSTAL DISPLAY DEVICE

FIELD OF THE INVENTION

The present invention relates to technological field of a liquid crystal display (LCD), and more particularly to an LCD module and LCD device.

DESCRIPTION OF PRIOR ART

LCD device is featured with low radiation, slim, compact, and low energy consumption, it has been widely used on mobile phone, personal digital assistance (PDA), notebook, personal computer, and television.

A typical LCD device generally includes an LCD panel, and a backlight module illuminating the LCD panel. The LCD panel is configured with a thin-film-transistor (TFT) substrate, and color filter (CF) substrate, and liquid crystal sandwiched between the TFT substrate and CF substrate.

Currently, LCD panel with narrowed border has been a trend. In the existing manufacturing technology, the sealant to seal the liquid crystal disposed between the TFT substrate and CF substrate is applied to a lower portion of a black matrix which is located in a lower edge of the LCD panel. The LCD panel is completed after the one-drop-filling (ODF) process of filling the liquid crystal into the space between the TFT substrate and CF substrate. However, when inspecting or seeing from a side of the LCD panel to the sealant, it is noted that because of the blockage of the circuits located on the peripheral of the substrate, the black matrix located on the side of the color filter substrate will block the penetration of the light. Since the colors between the black matrix and the sealant are very similar, the inspecting equipment can readily tell the real borders of the sealant. As a result, it is difficult to conduct a thorough inspection to the coverage of the sealant. The yield rate of the final product will be affected.

SUMMARY OF THE INVENTION

The objective of the present invention is to provide a technology to resolve the undistinguishable issue of the border of the sealant after it is applied and encountered during the manufacturing the LCD panel of narrowed border. The objective of this invention is intended to resolve such an issue.

In order to resolve the technical issue discussed above, the present invention provides a liquid crystal display module configured with a color filter substrate, a TFT substrate, a layer of liquid crystal, and a sealant. The TFT substrate and the color filter substrate are arranged opposite to each other and the sealant is used to confine the layer of liquid crystal within the space defined between the TFT substrate and the color filter substrate. The color filter substrate includes a first glass substrate, a transparent conductive layer, and a black matrix. Wherein the transparent conductive layer is laminated over the black matrix and defines a recess which is located on a surface facing the layer of liquid crystal of the first glass substrate. The recess is surrounded by the black matrix, and end of the sealant abuts against the recess, and a width of the sealant is smaller than the width of the recess.

In accordance with a preferred embodiment, wherein the TFT substrate includes a second glass substrate, and another end of the sealant stands put on the second glass substrate.

In accordance with a preferred embodiment, wherein the color filter substrate includes a first polarization filter and which is located on a surface of the first glass substrate distant to the layer of the liquid crystal, the recess defines a first pass which is not occupied by the sealant within the recess.

In accordance with a preferred embodiment, wherein the TFT substrate includes peripheral circuit which is located at a side of the second glass substrate facing to the layer of liquid crystal, a second pass is defined between the peripheral circuit and the sealant, the second pass is aligned with the first pass.

In accordance with a preferred embodiment, wherein the TFT substrate further includes a second polarization filter which is located at a side on the second glass substrate which is distant to the layer of liquid crystal, the angles of polarization of the first and second polarization filters are perpendicular to each other.

In order to resolve the technical issue discussed above, the present invention provides a liquid crystal display module configured with a color filter substrate, a TFT substrate, a layer of liquid crystal, and a sealant. The TFT substrate and the color filter substrate are arranged opposite to each other. The sealant is used to confine the layer of liquid crystal within the space defined between the TFT substrate and the color filter substrate. The color filter substrate includes a first glass substrate, a transparent conductive layer, and a black matrix. The TFT substrate further includes a second glass substrate. Wherein the transparent conductive layer covers the black matrix and defines a recess on a side of the first glass substrate facing the layer of liquid crystal. An end of the sealant abuts against the recess, and the other end stands put on the second glass substrate and creates a first and second passes around the sealant, the first and second passes aligned with each other.

In accordance with a preferred embodiment, wherein the color filter substrate further includes a first polarization filter, and the TFT substrate includes a second polarization filter, the angles of polarization of the first and second polarization filters are perpendicular to each other.

In accordance with a preferred embodiment, wherein the TFT substrate includes a peripheral circuit, the peripheral circuit is located at a surface of the second glass substrate facing the layer of liquid crystal, the second pass is located between the end of the sealant standing put on the second glass substrate and the peripheral circuit.

In accordance with a preferred embodiment, wherein the recess is indented toward the first glass substrate.

In order to resolve the technical issue discussed above, the present invention further includes a liquid crystal display device incorporated with a liquid crystal display module which includes a color filter substrate, a TFT substrate, a layer of liquid crystal, and a sealant. The TFT substrate and the color filter substrate are arranged opposite to each other. The sealant is used to confine the layer of liquid crystal within the space defined between the TFT substrate and the color filter substrate. The color filter substrate includes a first glass substrate, a transparent conductive layer, and a black matrix. The TFT substrate further includes a second glass substrate. Wherein the transparent conductive layer covers the black matrix and defines a recess on a side of the first glass substrate facing the layer of liquid crystal. An end of the sealant abuts against the recess, and the other end stands put on the second glass substrate and creates a first and second passes around the sealant, the first and second passes aligned with each other.

The present invention can be concluded with the following advantages. As compared to the existing art, the LCD module and LCD device made in accordance with the present invention can define an opening in the area adjacent to the black matrix of the TFT substrate, while de-route of the peripheral circuit of the TFT substrate thereby creating the upper and lower passes around the sealant, and a benchmark for testing and inspecting is created. After the deployment of the upper and lower polarization filters, no rotation effect will be created, and this is benefited to the identification of the deploying area of the sealant. Not only can this upgrade the quality, while this will not compromise the displaying effect. This is a perfect fit to the trend of narrowed boarder requirements. In conclusion, the present invention can readily provide a recognizable benchmark for identifying and checking the border of the sealant. The area of the sealant applied can be readily inspected and checked, therefore ensure the quality of the final product.

DETAILED DESCRIPTION OF PREFERRED EMBODIMENT

A detailed, thorough, concise and complete description regarding to a preferred embodiment will be given along with accompanied drawings. It should be noted that the embodiment disclosed is not all embodiment, but a typical representation. Other alternatives initiated from the spirit of the present invention will all be covered by the accompanied claims as they are readily appreciated by the skilled in the arts.

Figure 1:
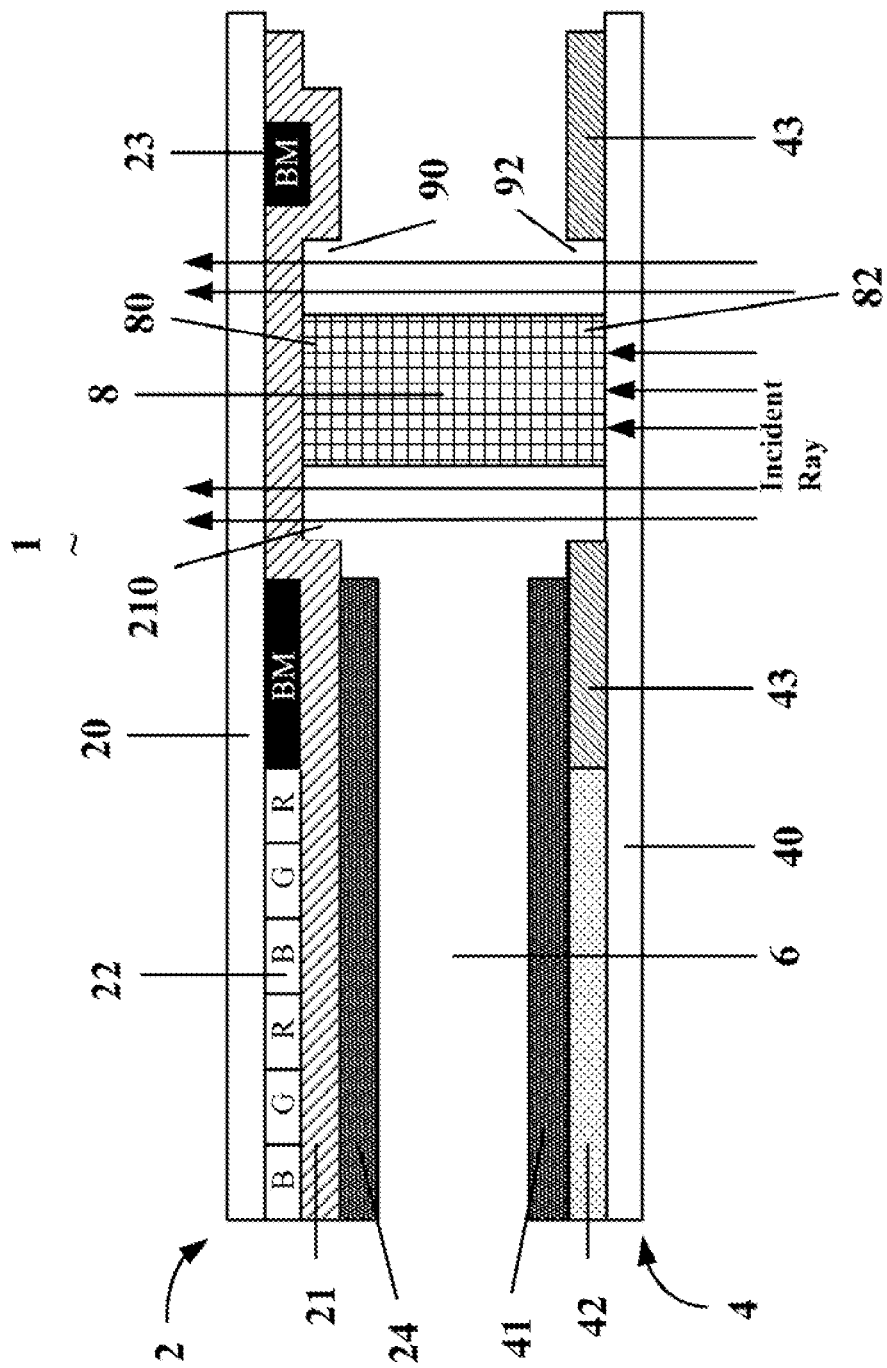
FIG. 1 is a cross sectional view of an LCD module made in accordance with a preferred embodiment of the present invention.
Figure 2:
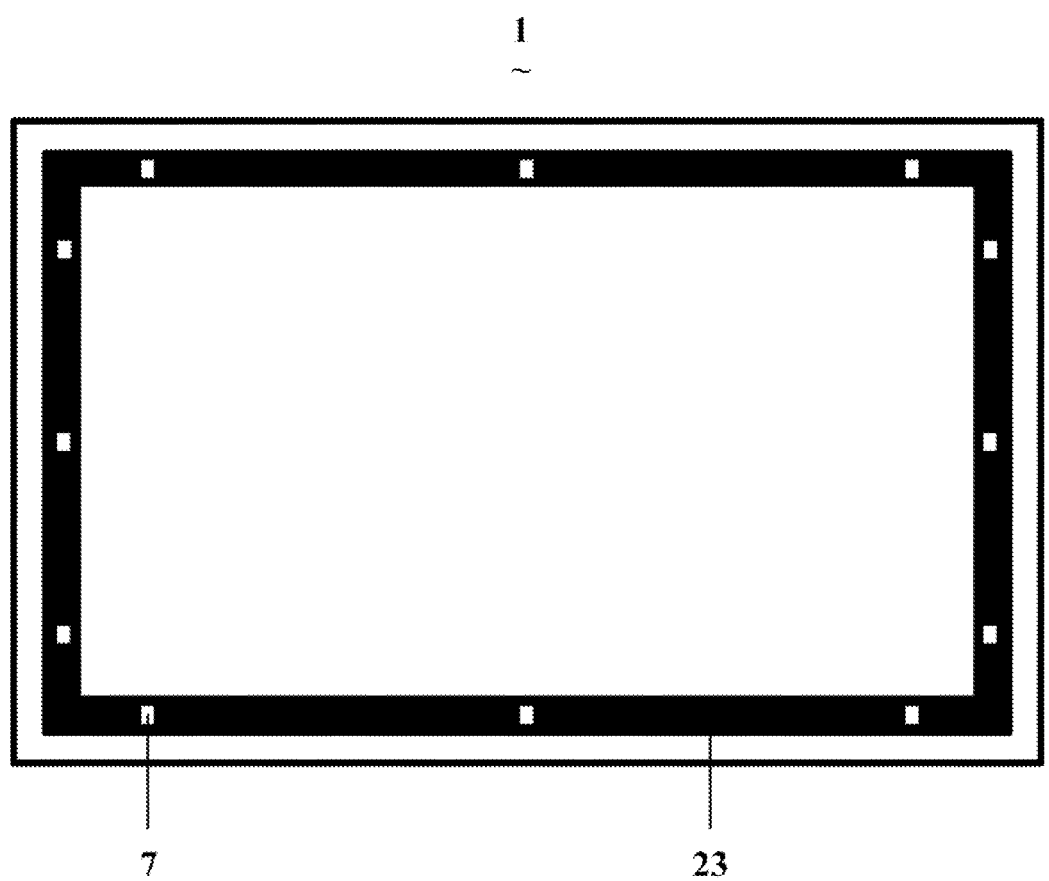
FIG. 2 is a front elevational view of the LCD module in FIG. 1.
Figure 3:
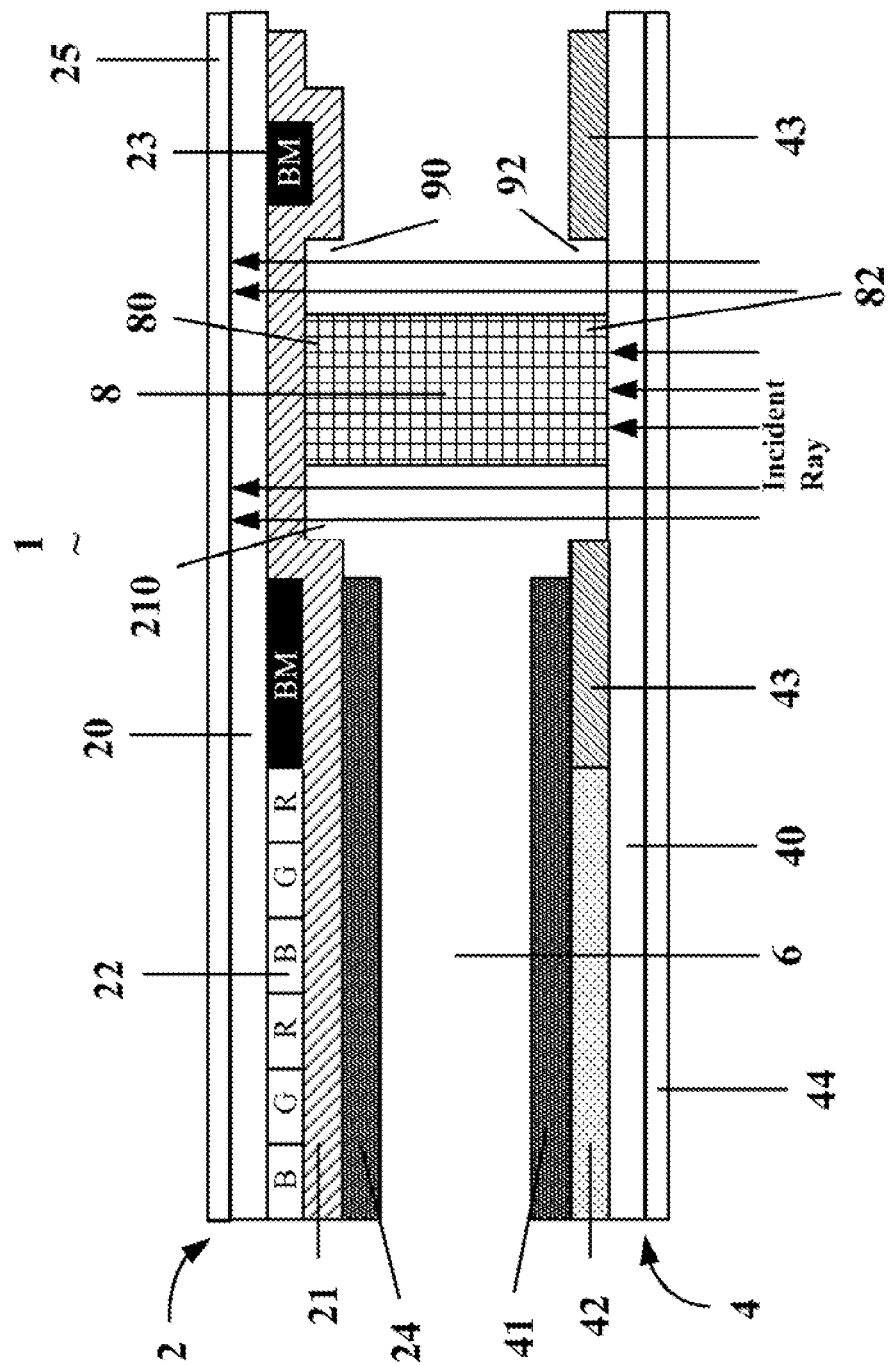
FIG. 3 is a cross sectional view of the LCD module after lamination of upper and lower polarized filters.

Referring to FIGS. 1 to 3, a liquid crystal display (LCD) module is shown, and FIG. 1 discloses a cross sectional view of an LCD module made in accordance with a preferred embodiment of the present invention. FIG. 2 is a front elevational view of the LCD module in FIG. 1; and FIG. 3 is a cross sectional view of the LCD module after lamination of upper and lower polarized filters.

The LCD module 1 includes a color filter substrate 2, a TFT substrate 4, a layer of liquid crystal 3, and a sealant 8. The TFT substrate 4 and the color filter substrate 2 are opposite to each other. The sealant 8 is used to confine the layer of liquid crystal 6 within the space defined between the TFT substrate 4 and the color filter substrate 2.

The color filter substrate 2 includes an upper glass substrate 20, a transparent conductive layer 21, an upper active area 22, a black matrix 23, an upper alignment film 24, and an upper polarized filter 25.

The glass substrate 20 is a transparent substrate, for example, an alkaline glass substrate can serve for the intended purpose. The glass substrate 20 is used as a vehicle carrying all the other elements. The active area 22 includes a plurality of RGB pixels. The transparent conductive layer 21 is deployed over the RGB pixels and the black matrix 23. In the preferred embodiment, the transparent conductive layer 21 can be made from Indium tin oxide (ITO) or Indium zinc oxide (IZO). The transparent conductive layer 21 defines recess 210 which is located on a side of the upper glass substrate 20 adjacent to the layer of liquid crystal 6. The recess 210 is indented toward the upper glass substrate 20. In the preferred embodiment, the recess 210 has a rectangular configuration. The polarized filter 25 is located on a surface of the glass substrate 20 distant away the liquid crystal 6.

The TFT substrate 4 includes a lower glass substrate 40, a lower alignment film 41, a lower active area 42, a peripheral circuit 43, and a lower polarized filter 44.

The glass substrate 40 is a transparent substrate, for example, an alkaline glass substrate can serve for the intended purpose. The glass substrate 40 is used as a vehicle carrying all the other elements. The lower active area 42 is located on a side of the lower glass substrate 40 adjacent to the layer of liquid crystal 6. The lower alignment film 41 is deployed over the surface of the active area 42 which is corresponding and aligned to the upper active area 22. The peripheral circuit 43 is located on a side of the lower glass substrate 40 adjacent to the lower glass substrate 40 and next to the lower active area 42. The lower alignment filter 44 is deployed on a surface of the lower glass substrate 40 distant to the layer of liquid crystal 6. The angle of polarization of both the upper alignment filter 25 and the lower alignment filter 44 are orthogonal to each other.

The sealant 8 is filled and disposed between the TFT substrate 4 and the color filter substrate 2. An upper end 80 of the sealant 8 is disposed within the recess 210, and a lower end 82 of the sealant 8 stands put on the lower glass substrate 40. The sealant 8 is arranged in a way such that an upper pass 90 and a lower pass 92 are defined. The upper pass 90 is defined and located between the upper end 80 of the sealant 8 and the recess 210. The lower pass 92 is defined and located between the lower end 82 of the sealant 8 and the peripheral circuit 43. The upper and lower passes 90 and 92 are aligned with each other. This means the width of the sealant 8 is small then the width of the recess 210, and a distance toward the peripheral circuit 43. It can be readily appreciated that the lower pass 92 defined between the peripheral circuit 43 and the lower end 82 of the sealant 8, and which is aligned to the upper pass 90 defined between the upper end 80 of the sealant 8 in the recess 210.

During the manufacturing process of the LCD module 1, the upper polarization filter 25 is still not deployed over the upper glass substrate 20, and the lower polarization filter 44 is still not deployed over the lower glass substrate 40. Accordingly, portion of the light beam projected from the TFT substrate 4 will be partially blocked by the sealant 8, while the other portion of the light beam can pass through the upper and lower passes 90 and 92, and eventually visible from the upper glass substrate 20. As compared to those light beams being absorbed by the black matrix 23, these projected light beams adjacent to the sealant 8 have a very high contrast, and which can be referred to "very bright" as seeing from the photosensitive cell, such as a CCD. As a result, this can be marked as a benchmark 7 and which can be used to identify the intended position of the sealant 8. With the inspecting device, such as a CCD, the border of the sealant 8 can be readily identified and checked. The inspection of the sealant 8 is therefore readily achieved.

The recess 210 can be defined by removing portion of the black matrix 23 in which the sealant 8 is applied. In the peripheral circuit 43, it can be specially designed through the TFT substrate 4 to de-route from an area with respect to the recess 210. As a result, the benchmark 7 can be formed as well.

After the sealant 8 is correctly and properly applied, the upper polarization filter 25 and the lower polarization filter 44 can be deployed accordingly. Referring to FIG. 3, after the lamination process is completed, the benchmark 7 will be covered by the upper polarization filter 25 and the lower polarization filter 44. Since the angle of polarization of the upper polarization filter 25 and the lower polarization filter 44 are orthogonal to each other, the light beam passes through the benchmark 7 will not create any rotation effect thereby preventing any leakage in the area of the benchmark 7.

The present invention further provides a LCD device (not shown). The LCD device includes the LCD module 1 and a backlight module used to illuminate the LCD module 1.

The present invention can be concluded with the following advantages. As compared to the existing art, the LCD module and LCD device made in accordance with the present invention can define an opening in the area adjacent to the black matrix of the TFT substrate, while de-route of the peripheral circuit of the TFT substrate thereby creating the upper and lower passes around the sealant, and a benchmark for testing and inspecting is created. After the deployment of the upper and lower polarization filters, no rotation effect will be created, and this is benefited to the identification of the deploying area of the sealant. Not only can this upgrade the quality, while this will not compromise the displaying effect. This is a perfect fit to the trend of narrowed boarder requirements.

In conclusion, the present invention can readily provide a recognizable benchmark for identifying and checking the border of the sealant. The area of the sealant applied can be readily inspected and checked, therefore ensure the quality of the final product.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. A liquid crystal display module, configured with a color filter substrate, a TFT substrate, a layer of liquid crystal, and a sealant, the TFT substrate and the color filter substrate being arranged opposite to each other, the sealant being used to confine the layer of liquid crystal within the space defined between the TFT substrate and the color filter substrate, the color filter substrate including a first glass substrate, a transparent conductive layer, and a black matrix, wherein the transparent conductive layer is laminated over the black matrix and defines a recess which is located on a surface facing the layer of liquid crystal of the first glass substrate, the recess being surrounded by the black matrix, and end of the sealant abutting against the recess, and a width of the sealant is smaller than the width of the recess.

2. The LCD module as recited in claim 1, wherein the TFT substrate includes a second glass substrate, and another end of the sealant stands put on the second glass substrate.

3. The LCD module as recited in claim 2, wherein the color filter substrate includes a first polarization filter and which is located on a surface of the first glass substrate distant to the layer of the liquid crystal, the recess defines a first pass which is not occupied by the sealant within the recess.

4. The LCD module as recited in claim 3, wherein the TFT substrate includes peripheral circuit which is located at a side of the second glass substrate facing to the layer of liquid crystal, a second pass is defined between the peripheral circuit and the sealant, the second pass is aligned with the first pass.

5. The LCD module as recited in claim 4, wherein the TFT substrate further includes a second polarization filter which is located at a side on the second glass substrate which is distant to the layer of liquid crystal, the angles of polarization of the first and second polarization filters are perpendicular to each other.

6. A liquid crystal display device, wherein the liquid crystal display device includes a LCD module as recited in claim 1.

7. A liquid crystal display module, configured with a color filter substrate, a TFT substrate, a layer of liquid crystal, and a sealant, the TFT substrate and the color filter substrate being arranged opposite to each other, the sealant being used to confine the layer of liquid crystal within the space defined between the TFT substrate and the color filter substrate, the color filter substrate including a first glass substrate, a transparent conductive layer, and a black matrix, the TFT substrate further including a second glass substrate, wherein the transparent conductive layer covers the black matrix and defines a recess on a side of the first glass substrate facing the layer of liquid crystal, an end of the sealant abutting to the recess, and the other end standing put on the second glass substrate and creating a first and second passes around the sealant, the first and second passes aligned with each other.

8. The LCD module as recited in claim 7, wherein the color filter substrate further includes a first polarization filter, and the TFT substrate includes a second polarization filter, the angles of polarization of the first and second polarization filters are perpendicular to each other.

9. The LCD module as recited in claim 7, wherein the TFT substrate includes a peripheral circuit, the peripheral circuit is located at a surface of the second glass substrate facing the layer of liquid crystal, the second pass is located between the end of the sealant standing put on the second glass substrate and the peripheral circuit.

10. The LCD module as recited in claim 7, wherein the recess is indented toward the first glass substrate.

* * * * *